United States Patent [19]

Papst

[11] Patent Number: 4,800,307
[45] Date of Patent: Jan. 24, 1989

[54] REPLACEABLE CIRCUIT BOARD MOUNTING SYSTEM IN OUTER ROTOR MOTORS

[75] Inventor: Georg Papst, St Georgen, Fed. Rep. of Germany

[73] Assignee: Papst-Motoren GmbH, St. Georgen, Fed. Rep. of Germany

[21] Appl. No.: 67,787

[22] PCT Filed: Sep. 17, 1986

[86] PCT No.: PCT/EP86/00537
§ 371 Date: Jul. 14, 1987
§ 102(e) Date: Jul. 14, 1987

[87] PCT Pub. No.: WO87/01879
PCT Pub. Date: Mar. 26, 1987

[30] Foreign Application Priority Data
Sep. 18, 1985 [CH] Switzerland ............ 4035/85

[51] Int. Cl.⁴ .................. H02K 29/00; H02P 1/00
[52] U.S. Cl. ............................. 310/67 R; 310/71; 310/89; 310/DIG. 6
[58] Field of Search .......... 310/67 R, 68 R, 68 B, 310/89, 268, DIG. 6; 361/399

[56] References Cited

U.S. PATENT DOCUMENTS

| | | | |
|---|---|---|---|
| 4,603,271 | 7/1986 | Maruyama et al. | 310/268 |
| 4,647,803 | 3/1987 | von der Heide et al. | 310/67 R |
| 4,663,549 | 5/1987 | Suzuki | 310/67 R |
| 4,673,834 | 6/1987 | Wrobel | 310/71 |

FOREIGN PATENT DOCUMENTS

| | | |
|---|---|---|
| 2632013 | 1/1978 | Fed. Rep. of Germany . |
| 2919058 | 11/1980 | Fed. Rep. of Germany ...... 361/399 |
| 202867 | 12/1982 | Japan . |

Primary Examiner—Peter S. Wong
Assistant Examiner—D. L. Rebsch
Attorney, Agent, or Firm—Barnes & Thornburg

[57] ABSTRACT

A circuit board containing control mechanisms for operation of an electric fan motor is fixedly assembled exteriorly to an end flange of the motor in only one position so that electrical contacts on the board extend through apertures in the end flange to cooperate with contacts on the motor side of the end flange to provide a completed motor. Assembly of the circuit board can be done without disassembly of the fan or motor, so that testing prior to insertion is possible.

27 Claims, 2 Drawing Sheets

REPLACEABLE CIRCUIT BOARD MOUNTING SYSTEM IN OUTER ROTOR MOTORS

BACKGROUND AND SUMMARY OF THE INVENTION

The invention relates to an electric motor having a flange disk that is arranged vertically to the motor shaft, and the stator being fixed to the interior side of said flange disk, and having a control circuit for the motor for which a circuit board is provided that is arranged plane-parallel to the flange disk on the side of the stator that faces the flange disk.

In the case of an electric motor of this type that is known from DE-Al No. 25 14 067, the circuit board is developed to be ring-shaped and is arranged coaxially to the motor shaft between the stator and the flange disk.

For the mass production of driving motors, an electric circuit is required that, as a rule, is manufactured at a separate manufacturing site. Those manufacturers of electric motors who are not equipped for manufacturing circuits of this type, purchase these, together with the circuit board, from the outside. Large-scale purchasers of electric motors of this type are often manufacturers of electronic apparatuses. Under certain circumstances, these large-scale purchasers may be able to cost-effectively manufacture these circuits with the circuit boards themselves. This is particularly true if the electric motors in question are part of a fan, for such fans are often used for the cooling in electronic apparatuses.

For this reason, it is an objective of the invention to develop an electric motor of the initially mentioned type in such a way that the circuit board with the circuit can subsequently be conveniently installed into the otherwise completely finished electric motor, for the purpose of rationalizing the manufacturing process, in that, for example, the manufacturer of electric motors furnishes the electric motors to his customers without the circuit board, and the customer can then manufacture the circuit boards rationally himself and can also install them subsequently in a convenient way.

An objective is achieved by the fact that the circuit board is arranged on the exterior side of the flange disk that faces away from the stator.

For this purpose, the circuit board is preferably ring-shaped—possibly with recesses at the exterior edge—and arranged coaxially to the motor shaft.

The invention makes it possible to prefabricate unfinished driving motors that are fully operable finished driving motors, except for the circuit board that has to be inserted, and then subsequently, when required, equip them with a circuit board and as a result finish them completely.

Circuit boards may be used that are equipped with different control circuits, according to the desired motor operation. In this case, only one single unfinished motor type must be held available for different types of motors, which simplifies mass production and also warehousing.

The circuit boards may be glued in, clamped in, screwed in or fastened in another way. It is advantageous to fasten the circuit board by means of a locking means into which the circuit board can be easily inserted. On such a locking arrangement, a passageway is provided through the circuit board and spring elements on the flange disk are compressed together and inserted through the passageway and then allowed to expand and catch onto recess areas on the circuit board, to hold the circuit board to the flange disk. In this way, the subsequent mounting of the circuit board is largely prepared and facilitated.

The connection of the stator to the circuit board may take place by soldered or welded electrical connections. The required soldering and welding operations are not necessary if the connection is established by means of contacts connected to the stator which automatically cooperate with counter-contacts on the circuit board when the board is inserted into the flange disk.

It is recommended to cover the circuit board on its back side facing away from the flange disk by means of an insulating plate. The insulating plate may be a glued-on foil.

The circuit board is held securely and also protected with respect to mechanical outside effects if a recess is provided on the exterior side of the flange disk, into which the circuit board fits. In this case, the fit can exist only in the case of a certain rotating position of the circuit board and always ensure the same assembly situation.

It is desirable that the circuit board not protrude to the outside from the contour of the flange disk and thus not increase the axial length of the electric motor. This can be achieved by a correspondingly flat development of the circuit board and a deep development of the indentation.

Under certain circumstances, built-up circuit elements are used in the control circuit. These are preferably arranged on the front side of the circuit board that faces the flange disk, and if they do not find space in the identation, they will find space in the provided recesses and/or breakthroughs of the flange disk.

The magnetic field change-over in response to the revolution timing of an electric motor, in the case of modern motors of the type that is concerned here, preferably takes place by a contactless scanning of the respective rotational position of the rotor. A sensor element that is required for this purpose, for its function, must have a certain position in proximity of the rotor.

The invention can preferably be used in motors that are equipped with this type of sensor element, because, by means of the invention, it can be ensured in a simple way that the sensor element, when the circuit board is inserted, always takes up precisely the position that is indicated for its function. To that end, the sensor element is mounted to the circuit board at its exterior side and extends through an aperature therein toward the rotor so that when the circuit board is positioned securely in its recess in the flange disk, the sensor is extended through the aperture adjacent the rotor. Since the circuit board can only be located in one position on the flange disk, the sensor is always positioned accurately.

In such a case, the development as a collectorless direct-current motor having a permanent-magnetic external rotor is preferred.

The sensor element may be a Hall generator. Preferably this Hall generator will be combined with the pertaining amplifier to form one single, integrated control element. This type of Hall generator, when the circuit board is inserted, projects close to the rotor poles, while leaving an air gap.

Advantageously, the circuit board can be inserted into the otherwise completely mounted unfinished motor in such a way that the unfinished motor, when the circuit board is inserted and connected and when, if required, the insulating disk is placed on it, is finished and operable. In this way, the motor is prefabricated except for the circuit board and its connection. The subsequent completion by equipping with the circuit board requires only minimal expenditures.

A preferred use of the invention is in connection with a fan driven by a small electric motor, because fans of this type, in large numbers, are installed into eletronic and electrical apparatuses for the purpose of cooling them. The manufacturers of these electrical apparatuses who buy these fans from the outside from other manufacturing specialists, are well equipped for manufacturing electrical circuit boards and can particularly utilize the capacity for later installing the circuit board provided by means of the invention. In this case the circumstance also has an effect that this circuit board must be connected to the circuit of the electronic apparatus, so that the connecting process for the connection of the circuit board to the unfinished motor is compatible with manufacturing of the apparatuses.

Electric motors of the type that is concerned here, as a rule, are tested with respect to their operation. This type of test is also desirable for the unfinished motors, if these are furnished for being later equipped with the circuit board. A manufacturing process that permits this type of testing of the unfinished motors in a simple way is obtained by having the motor complete except for the circuit board so that it can be tested and shipped. At the shipped to site, the circuit board is added without disassembly of any of the motor portions to render a complete motor unit. Therefore full testing of the motor and pump can occur at the factory.

These and other objects, features, and advantages of the present invention will become more apparent from the following description when taken in connection with the accompanying drawings which show, for the purposes of illustration only, one embodment in accordance with the present invention, and wherein:

DETAILED DESCRIPTION OF THE DRAWINGS

Figure 1:
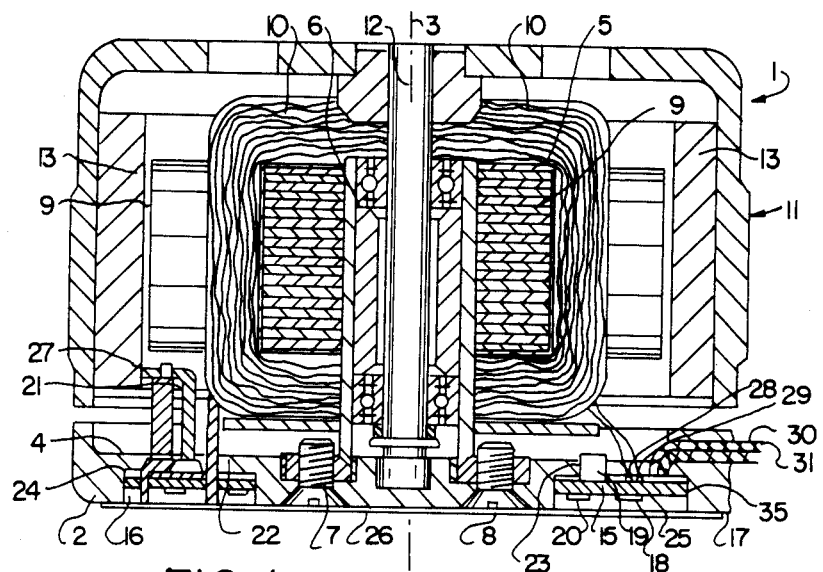
FIG. 1 is a cross-sectional view of an electric motor.

Referring now to the drawings wherein like reference numerals are used to designate like parts and more particularly to FIG. 1 where the electric motor 1 that has a flange disk 2 that extends vertically and essentially coaxially with respect to the motor shaft 3. At the interior side 4 of the flange disk, the stator 5 is fastened. For this purpose, the bearing tube 6, by means of screws 7, 8, is screwed to the flange disk 2. The bearing pipe 6 is pressed into the bundle of plates 9. One of two provided stator coils has the reference number 10.

The electric motor 1 is an external rotor motor, the external rotor of which has the reference number 11. The shaft 12 of the external rotor 11 is rotatably disposed in the bearing pipe 6. The electric motor 1 is a collectorless direct-current motor, the external rotor 11 of which is equipped with a permanent magnet 13. A ring-shaped circuit board has the reference number 15 and, plane-parallel to the flange disk and coaxially to the motor shaft 3, is fitted into an indentation 16 on the exterior side 17 of the flange disk 2. This circuit board 15 carries a control circuit for the motor which, in addition to other circuit elements 18, 19, 20, includes a Hall generator 21 that as the sensor element recognizes the rotating position of the rotor 11. There is an air gap 27 between the generator 21 and rotor 11, allowing the generator 21 to approach the rotor poles of the rotor 11. The Hall generator 21 as well as the control element 19 does not have sufficient space in the indentation 16 and for this reason, a breakthrough 22, 23 is provided in the flange disk 2 through which the respective control element will then protrude.

The raised control elements are arranged on the front side 24 of the circuit board 15 that faces the flange disk, and the circuit board is embedded so deeply in the indentation 16 that with none of its parts it protrudes beyond the outer contour that is given by the back side 25 of the flange disk. The back side 25 of the flange disk is covered by a glued-on insulating disk 26 that extends generously beyond the circuit board.

By means of soldered connections 28, 29, the control circuit is electrically connected to the stator coil 10. Corresponding soldered connections are also provided for the other stator coil that is not shown.

Current is supplied via the electric lines 30, 31 leading to the outside and to the control circuit of the circuit board.

The circuit board 15 may also be inserted subsequently, together with the control elements 18, 19, 20, 21, into the otherwise completed unfinished motor. By means of edge projections, such as the edge projection 35 at the flange disk and corresponding edge recesses at the circuit board 15, it is ensured that the circuit board is always inserted in the same indicated position in which the Hall generator 21 takes up the position closely opposite the rotor poles of the rotor 11 that is provided for its operation.

For the finishing of the unfinished motor, the circuit board is first inserted, is then electrically connected by means of the soldered connections 28, 29 and is finally covered by the insulating plate 26.

The circuit board 15 is fastened by means of gluing, but may also be fastened by means of screwing or by means of locking elements, as will be discussed further below for another embodiment.

Figure 3:
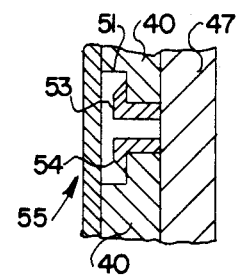
FIG. 3 is a cutout III from FIG. 2.
Figure 2:
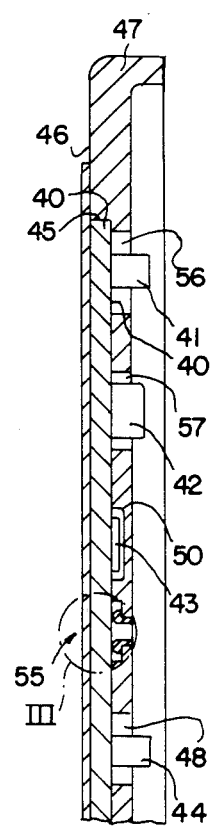
FIG. 2 is a cross-sectional view of a circuit board that is inserted into a flange disk.

The circuit board 40 of FIGS. 2 and 3 is equipped with control elements 41, 42, 43, 44 that are part of the control circuit. These control elements are raised and do not find space in the indentation 45 on the back 46 of the flange disk 47. For this purpose, breakthroughs 56, 57, 48 and recesses 50 are provided for these control elements.

The circuit board 40 fits into the indentation 45 only in one single rotating position. This is secured by several locking elements which are distributed on the surface of the circuit board. One of these locking elements is visible in FIGS. 2 and 3 and has the number 55.

The locking element 55 is provided on the back side 46 of the flange disk 47 and, when the circuit board is inserted, interacts with a corresponding counterlocking element 51 of the circuit board 40 and forms a locking means that in each case is spring-loaded and holds the circuit board.

The locking element 55 consists of two locking hooks 53, 54 that are in a resilient relationship with respect to one another. The counterlocking element 51 is a stepped receiving opening in the circuit board. The locking hooks 53, 54, against the spring force that is inherent to them, can be bent with respect to one another from the locking position shown in FIG. 3 so that the circuit board can be fitted on and also be removed again.

Figure 4:
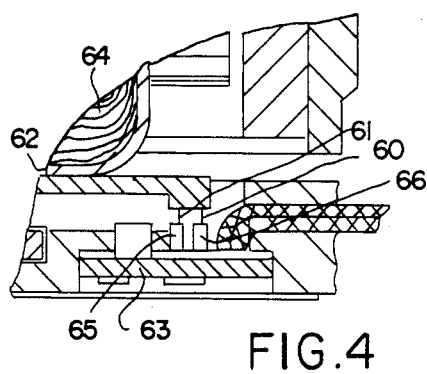
FIG. 4 is a cutout IV from FIG. 1 for an embodiment that was modified with respect to FIG. 1.

In the case of the embodiment that was only partially shown in FIG. 4, stationarily arranged contact pins 60, 61 are provided for the connection of the stator coil 64, the winding ends of the coil being connected to said contact pins 60, 61. The contact pins are disposed in a thickened end of an endplate 62 made of plastic that extends along one face of the coil 64. These contact pins 60, 61, when the circuit board 63 is inserted, fit into countercontacts 65, 66 developed as bushes that are fastened at the circuit board 63 and connected to the control circuit of this circuit board. When the circuit board is inserted, the contact pins 60, 61 find an electrically conducting contact with the countercontacts 65, 66. Corresponding contact connections are also provided for the other stator coil that is not shown. Otherwise, this embodiment is developed to be identical with the embodiment shown in FIG. 1.

Figure 5:
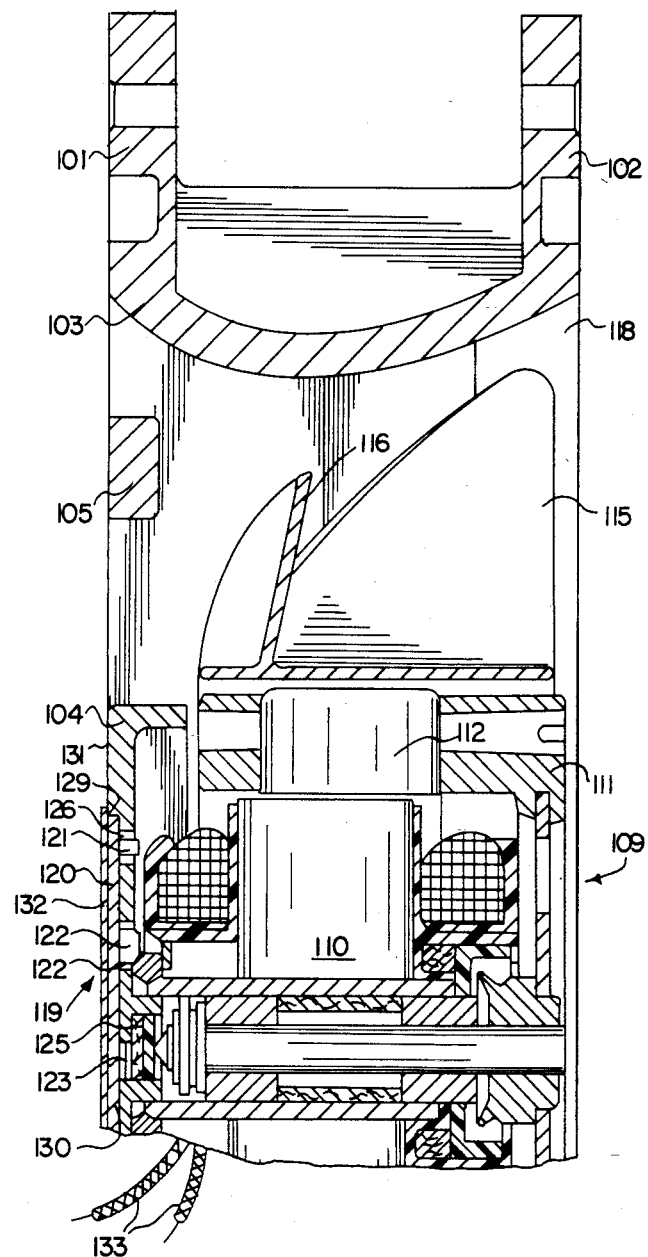
FIG. 5 is a cross-sectional view of a fan.

In FIG. 5, two square rectangular frames of equal size have the reference numbers 101 and 102 and are arranged at both ends of a pipe section 103 and narrowly surround said pipe section. On the intake side of the pipe section, a flange disk 104 having four spokes is mounted at the pipe section 103 coaxially with respect to the pipe section, only one spoke 105 of said spokes being visible in the drawing in sectional view. The flange disk, with the spokes, extends at one end of the pipe section, but is still located inside the pipe section. The parts that have been described up to now are made of metal.

At the flange disk, the driving motor 109 is located completely inside said pipe section and coaxially to it. The stator has the reference number 110, and the rotor has the number 111. The rotor surrounds the stator with a cup-shaped exterior part 112. On the outside of this exterior part 112 of the rotor, fan vanes 115, 116 are mounted that extend in the ring-shaped flow duct 118 recessed between the exterior part 112 of the rotor and the pipe section 103.

For the control and the power supply of the driving motor, an electrical control circuit 119 is used that is mounted on a circuit board 120. The raised control elements 121, 122, 123 are all arranged on the front side of the circuit board that faces the flange disk. For these raised control elements, recessed are provided in the flange disk, namely, for control element 123, the recess 125 and for the control elements 121, 122, the breakthroughs 126, 127 so that these control elements will find room. The overall size of the recesses is only such that they do not impair the required stability of the flange disk. The circuit board is fitted into a rear indentation 129 of the flange disk and, on its back 130, is flush with the back 131 of the flange disk. So that the circuit board is installed in the correct angular orientation, it has at its circumference an invisible notch, to which an invisible nose of the flange disk corresponds. The circuit board is held by its fit in the identation 129 and by invisible locking hooks that correspond to the locking hooks of FIG. 3.

An insulating plate 132 with an excess edge is glued onto the back 130 of the circuit board.

For the outside power supply of the circuit and of the other parts of the driving motor, a current lead 133 is provided that originates from the circuit board, is embedded in a prepared groove of a spoke and ends at a current connection contact.

For the connection of the current lead 133 to the circuit board, for the power supply of the stator coils and for the control of these coils, contacts are used that are provided at the circuit board and countercontacts that are arranged at the flange disk 104, said contacts and countercontacts being opposite one another when the circuit board is inserted, being developed as soldering or welding contacts and being connected with one another by soldering or welding when the circuit board is inserted. Lines lead from the countercontacts to the stator coils.

The fan shown in FIG. 5 can be completely assembled except for the circuit board. After this has happened, it is possible, for example, at a distant usage site, to subsequently install the circuit board with the circuit. Nothing has to be removed for this purpose, and the otherwise prefabricated fan can remain the way it is.

After the circuit board is inserted, it is held by locking elements. Now the contacts must still be connected with the pertaining countercontacts and then the insulating plate 132 can be glued on and the fan is fully operable.

It is also an advantage, in the case of the invention, that by means of the easy accessibility of the circuit board, the circuit board can be exchanged later if the control circuit cannot be used if the motor is to be controlled by a different control circuit.

During manufacturing, the following process is recommended. First, an unfinished motor is used that, except for the inserted and connected circuit board, is a fully operable electric motor. Then this unfinished motor is connected to a testing circuit that corresponds to the control circuit of an assigned circuit board and is tested. Now the unfinished motor can be furnished to a customer who inserts an assigned circuit board, connects it and, if necessary, covers it by an insulating plate.

While I have shown and described only one embodiment in accordance with the present invention, it is understood that the same is not limited thereto but is susceptible to numerous changes and modifications as known to one having ordinary skill in the art, and I therefore do not wish to be limited to the details shown and described herein, but intend to cover all such modifications as are encompassed by the scope of the appended claims.

I claim:

1. An electric motor having a motor shaft and a flange disk that is arranged at right angles to the motor shaft; a stator fixed to an interior side of said flange disk; a control circuit means for the motor for which an insertible circuit board means is provided and arranged in a plane, parallel to the flange disk on the exterior side of the flange disk that faces away from the stator, said control circuit means providing electrical connection with control elements on the circuit board means which extend through the flange disk and cooperate with cooperating elements of the motor located on the interior side of the flange disk.

2. An electric motor according to claim 1, wherein locking elements means are provided at the exterior side of the flange disk that interact with corresponding counterlocking elements means of the circuit board means to form a spring-loaded locking means holding the circuit board means in position when inserted.

3. An electric motor according to claim 1, wherein the electrical connection includes in part that the stator is connected electrically to stationarily arranged contact pin means; and countercontact bush means are provided on the circuit board means cooperating with said contact pin means to provide said electrical connection with said contact means when the circuit board means is inserted.

4. An electric motor according to claim 1, wherein the circuit board means has a back side that faces away from the flange disk and is covered by an insulating plate.

5. An electric motor according to claim 1, wherein the exterior side of the flange disk is provided with an indentation into which spring hook means on the circuit board means fit.

6. An electric motor according to claim 1, wherein raised control elements are arranged on a front side of the circuit board means facing the flange disk and at least one of recesses and breakthroughs are provided in the flange disk for the raised control elements.

7. An electric motor according to claim 1, wherein the control circuit means has a sensor element that recognizes the rotating position of a rotor; of the motor; said sensor element arranged on the front side of the circuit board means and, when the circuit board is inserted, protruding through an assigned breakthrough provided in the flange disk, up to the rotor; and wherein the circuit board means can be inserted into the flange disk in only one single position with respect to said flange disk.

8. An electric motor according to claim 7, wherein the electric motor is a collectorless direct-current motor with a permanent magnetic external rotor; and the sensor element, when the circuit board means is inserted, projects close to the rotor poles while leaving an air gap.

9. An electric motor according to claim 7, wherein the sensor element has a Hall generator.

10. An electric motor according to claim 1, wherein power lead means are provided for the external power supply of the control circuit means and other parts of the motor from the circuit board means.

11. An electric motor according to claim 1, wherein the circuit board means can be inserted into an otherwise completely assembled unfinished motor without disassembly of said otherwise unfinished motor.

12. An electric motor according to claim 1, wherein the motor has an external rotor motor means to drive a fan; said fan is equipped with a pipe section and surrounds a flow duct on the interior of which the motor is coaxially disposed; spokes means for fastening the flange disk at the pipe section with the flange disk at one end of the pipe section; and said rotor means having a ring of vanes that are fastened on the outside at the rotor and extend inside the pipe section in a ring-shaped recessed flow duct.

13. An electric motor according to claim 5, wherein raised control elements are arranged on a front side of the circuit board means facing the flange disk and at least one of recesses and breakthroughs are provided in the flange disk for the raised control elements.

14. An electric motor according to claim 8, wherein the sensor element has a Hall generator.

15. An electric motor according to claim 2, wherein the electrical connection includes in part that the stator is connected electrically to stationarily arranged contact means; and countercontacts means cooperating with said contact means to cause an electrical connection with said contact means when the circuit board means is inserted.

16. An electric motor according to claim 2, wherein the exterior side of the flange disk is provided with an indentation into which the circuit board means fits.

17. An electric motor according to claim 3, wherein the exterior side of the flange disk is provided with an indentation into which the circuit board means fits.

18. An electric motor according to claim 4, wherein the exterior side of the flange disk is provided with an indentation into which the circuit board means fits.

19. An electric motor according to claim 15, wherein the exterior side of the flange disk is provided with an indentation into which the circuit board means fits.

20. An electric motor according to claim 2, wherein raised control elements are arranged on a front side of the circuit board means facing the flange disk and at least one of recesses and breakthroughs are provided in the flange disk for the raised control elements.

21. An electric motor according to claim 3, wherein raised control elements are arranged on a front side of the circuit board means facing the flange disk and at least one of recesses and breakthroughs are provided in the flange disk for the raised control elements.

22. An electric motor according to claim 4, wherein raised control elements are arranged on a front side of the circuit board means facing the flange disk and at least one of recesses and breakthroughs are provided in the flange disk for the raised control elements.

23. An electric motor according to claim 19, wherein raised control elements are arranged on a front side of the circuit board means facing the flange disk and at least one of recesses and breakthroughs are provided in the flange disk for the raised control elements.

24. An electric motor according to claim 15, wherein raised control elements are arranged on a front side of the circuit board means facing the flange disk and at least one of recesses and breakthroughs are provided in the flange disk for the raised control elements.

25. An electric motor according to claim 16, wherein raised control elements are arranged on a front side of the circuit board means facing the flange disk and at least one of recesses and breakthroughs are provided in the flange disk for the raised control elements.

26. An electric motor according to claim 17, wherein raised control elements are arranged on a front side of the circuit board means facing the flange disk and at least one of recesses and breakthroughs are provided in the flange disk for the raised control elements.

27. An electric motor according to claim 18, wherein raised control elements are arranged on a front side of the circuit board means facing the flange disk and at least one of recesses and breakthroughs are provided in the flange disk for the raised control elements.

* * * * *